United States Patent
Wayne

(10) Patent No.: US 7,504,367 B2
(45) Date of Patent: Mar. 17, 2009

(54) METHOD OF CONTROLLING LUBRICANT PROPERTIES BY MEANS OF DILUTING THE SAME

(75) Inventor: Frank David Wayne, Chester (GB)

(73) Assignee: Shell Oil Company, Houston, TX (US)

( * ) Notice: Subject to any disclaimer, the term of this patent is extended or adjusted under 35 U.S.C. 154(b) by 749 days.

(21) Appl. No.: 10/511,337

(22) PCT Filed: Apr. 17, 2003

(86) PCT No.: PCT/EP03/04182

§ 371 (c)(1), (2), (4) Date: Oct. 15, 2004

(87) PCT Pub. No.: WO03/087650

PCT Pub. Date: Oct. 23, 2003

(65) Prior Publication Data

US 2005/0233913 A1    Oct. 20, 2005

(30) Foreign Application Priority Data

Apr. 18, 2002   (GB) ................. 0208880.5

(51) Int. Cl.
  *C10M 107/34*  (2006.01)
(52) U.S. Cl. ..................................... 508/579
(58) Field of Classification Search ................ 508/579
  See application file for complete search history.

(56) References Cited

U.S. PATENT DOCUMENTS

| 2,782,240 | A |   | 2/1957  | Hefner et al. ............. 260/613 |
| 2,841,479 | A |   | 7/1958  | Hefner et al. ............. 44/58   |
| 3,966,624 | A | * | 6/1976  | Duling et al. ............. 508/307 |
| 5,342,531 | A | * | 8/1994  | Walters et al. ............ 508/272 |
| 5,962,381 | A | * | 10/1999 | Bovington ................ 508/501   |

FOREIGN PATENT DOCUMENTS

| DE | 921 239   | 12/1954 |
| GB | 588 712   | 6/1947  |
| JP | 57134098  | 8/1982  |
| JP | 62289533  | 12/1987 |
| JP | 62294628  | 12/1987 |
| JP | 05 071328 | 3/1993  |
| JP | 10317936  | 2/1998  |
| WO | 96/11244  | 4/1996  |

OTHER PUBLICATIONS

International Search Report dated Jul. 23, 2003.
Kirk-Othmer's Encyclopedia of Chemical Technology, 2nd Ed., vol. 19, p. 553.

* cited by examiner

*Primary Examiner*—Walter D Griffin
*Assistant Examiner*—Frank C. Campanell

(57) ABSTRACT

A process is provided for controlling two or more properties of a lubricant or working fluid for use in a system in which operating conditions change. The process contains the steps of: (i) providing a base fluid in which the two or more properties are optimal for "warm" operating conditions; (ii) providing a diluent which is miscible with the base fluid under all system operating conditions; and, (iii) reversibly diluting said base fluid with the diluent in response to change in system operating conditions. An apparatus for carrying out the process is also disclosed.

13 Claims, No Drawings

METHOD OF CONTROLLING LUBRICANT PROPERTIES BY MEANS OF DILUTING THE SAME

The present invention relates to a process for simultaneously controlling two or more properties of a lubricant or working fluid which lubricant or working fluid is suitable for use in a system which is subject to a range of operating conditions. The invention further relates to apparatus for carrying out said process.

The properties of lubricating fluids vary with changes in the conditions under which they are utilised. For example, the viscosity of a lubricant increases as the temperature of the lubricant decreases. This presents difficulties in designing lubricating systems which provide effective, if not optimum, lubrication over a range of operating temperatures. A lubricant with an optimal viscosity at a high operating temperature may be far too viscous to permit a machine to operate safely in, or even to be started from, cold or low ambient conditions. In response to this problem, lubricating systems utilising multiple phases of lubricants have been proposed, for example in International Publication No. WO-A-96/11244.

However, more than one property of a lubricant or working fluid may vary as conditions under which the lubricant or working fluid is utilised vary. For example, as the temperature of a lubricant or working fluid varies, its viscosity, density, pressure response of viscosity, compressibility and the propensity of the viscosity to change with shear rate, all vary. The lubricant film thickness in a particular contact will also vary with temperature. In many cases, one desirable property may be inconveniently inextricably linked to a large temperature dependence of another property.

In traction drives, power and torque are transmitted between machine elements having smooth surfaces through fluids or lubricants sometimes called "traction fluids". For example, traction fluids enable one smooth rotating wheel to drive another smooth wheel that is pressed against it, like gears without teeth. The motion is a mixture of rolling and sliding. The traction coefficient is the ratio of the tangential force to the normal force. The normal force is the force that presses the two surfaces together. The higher the traction coefficient, the more effectively the device can transmit power. Therefore, it is desirable that the lubricant that is applied to reduce wear by separating the metal surfaces possesses as high a coefficient of traction (also called friction) as possible under all conditions in which the traction drive operates. The improved performance associated with a higher traction coefficient could be exploited, for example, by making the device smaller and lighter. However, the traction coefficient of a traction fluid usually varies with temperature, e.g. the traction coefficient under cold start up conditions may be different to that under warm operating conditions. This has the result that devices, such as transmissions for vehicles, cannot be designed to exploit the highest values of traction coefficient.

Furthermore, fluids that possess high traction (i.e. a high traction coefficient) at a particular temperature tend to exhibit a large variation of viscosity with temperature as the temperature changes through that point. To transmit force, the viscosity of the traction fluid must rise to high values as it is subjected to the high pressure in the load-bearing zone between the metal surfaces. However, a rapid increase in viscosity with pressure is usually associated with a rapid change in viscosity (i.e. low-shear ambient pressure dynamic viscosity) with temperature. Conversely fluids which have a viscosity that changes little with temperature, have a low pressure coefficient of viscosity and, most probably, have a low traction coefficient. Therefore, in selecting a traction fluid, the designer is forced to compromise the value of the traction coefficient so that the fluid will be of a low enough viscosity at low temperatures to be able to operate. A fluid having a high traction coefficient (e.g. 0.095 or above, measured at a slide-to-roll ratio (SRR) of 2.2% with a pressure in the contact of 1.125 GPa) at operating temperatures such as 110° C., will become unacceptably viscous at lower temperatures, in particular at the cold start-up temperatures that are commonly encountered during winter even in temperate climates. Typically, a lubricant formulated to keep its viscosity low enough for easy cold starting will possess a traction coefficient at warmed up operating conditions well below the maximum traction coefficient that has been observed in any fluid, of approximately 0.118. Currently the best compromises of traction fluids offer high viscosity at low temperatures and moderate traction at warmer operating temperatures.

There remains a need for a traction fluid which possesses a high traction coefficient over the entire temperature range within which the traction fluid must operate and which traction fluid has an effective viscosity over the same temperature range. Such a traction fluid would be of particular benefit for infinitely variable transmissions.

A similar conflict between the properties required at warm operating conditions and those required to permit start up under cold conditions is found for working fluids such as hydraulic fluids for large construction equipment for use, e.g., in severe climates. In such climates start-up temperatures can be as low as −40° C. and warm operating temperatures can be up to 95° C. For hydraulic fluids, properties such as viscosity, compressibility and the pressure response of viscosity are important for effective system operation. An ideal hydraulic fluid, for example, might have a low compressibility in combination with pressure- and temperature-independent viscosity. Such a fluid cannot be achieved in practice. Low compressibility is associated with a rapid increase in viscosity with pressure and a strong dependence of viscosity on temperature. To deal with this conflict in properties in hydraulic fluids, operators may resort to "exercising" unloaded hydraulic equipment for an hour before starting productive work in very cold conditions. This is clearly an expensive and unsatisfactory solution to the problem.

Even in temperate climates the temperature of the hydraulic oil may change by 60 to 80° C. from its starting temperature to the warm operating temperature, in a hydraulic circuit subjected to continuous or heavy usage. The change in viscosity that is a consequence of this temperature change, alters the mechanical and volumetric efficiencies of the hydraulic system. In this context, the mechanical efficiency is a measure of the work required to pump the fluid around the circuit. The volumetric efficiency is a measure of the internal leakage of high pressure fluid past the sliding seals of the actuators. The increase in internal leakage as the viscosity decreases with increasing temperature, may reduce the force that that the hydraulic actuators can apply. An effective balance of mechanical and volumetric efficiencies cannot be maintained across the temperature range.

There remains a need for a hydraulic fluid whose viscosity remains constant within certain limits over the entire temperature range at which the fluid must operate, and which fluid simultaneously possesses a low compressibility and an effective pressure response of viscosity.

The present invention solves the above-mentioned problems by providing a process by which two or more properties of a lubricant or working fluid can be maintained at optimal or effective values over a range of system operating conditions.

Thus, the present invention provides a process for controlling two or more properties of a lubricant or working fluid which lubricant or working fluid is suitable for use in a system in which operating conditions change which process comprises:
(i) providing a base fluid in which the two or more properties are optimal for "warm" operating conditions;
(ii) providing a diluent which is miscible with said base fluid under all system operating conditions; and
(iii) reversibly diluting said base fluid with the diluent in response to change in system operating conditions.

It has surprisingly been found that, by choosing the base fluid and diluent according to specific criteria, two or more properties of a lubricant or working fluid can be simultaneously controlled by reversible dilution of the base fluid in response to variations in the operating conditions under which the lubricant or working fluid is used.

The systems to which the process of the present invention applies include systems which comprise moving components that require lubrication. Such systems may be engines or automobile transmissions that have moving components that require traction fluids. Examples of such moving or operating components are gears, bearings, clutches and traction drive variators. The process of the present invention also applies to hydraulic systems that are actuated by working fluids such as hydraulic fluids under pressure. Examples of moving components in hydraulic systems are actuators. The lubricant of the present invention may have a general lubricating function or it may have other functions such as torque transmission as in traction fluids. The working fluid of the present invention may be a lubricant that can be used as an hydraulic fluid.

In one aspect of the present invention there is provided a process for lubricating a system in which operating conditions change which process comprises:
(i) controlling two or more properties of a lubricant; and
(ii) applying the resultant lubricant to the system.

In another aspect of the present invention there is provided a process for providing a working fluid for a system in which operating conditions change which process comprises:
(i) controlling two or more properties of the working fluid; and
(ii) applying the resultant working fluid to the system.

By applying the resultant lubricant and/or working fluid to the system includes bringing it into contact with a moving or operating component of the system.

The properties to be controlled depend on the nature of the task that the lubricant or the working fluid is required to perform in a particular type of machine. Preferably, one of the properties is viscosity as this is a key property for most lubricants and working fluids. By viscosity is meant the low-shear ambient pressure dynamic viscosity. In, e.g. a hydraulic fluid, the compressibility and/or the pressure response of viscosity and/or the lubricating film thickness may be controlled. In, e.g. a traction fluid, the traction coefficient may be controlled. In a preferred embodiment, the process of the present invention controls the viscosity in addition to one or more other property (properties) of a lubricant or working fluid for use in a system in which operating conditions are subject to change. In a more preferred embodiment, the process of the present invention controls two properties of the lubricating or working fluid.

In the process of the present invention, two or more properties of the lubricant or working fluid are controlled. By "controlled" is meant that the properties in question are maintained at values which are effective for system operation and are preferably optimal for system operation. The acceptable variation of the value of each property from the optimal "warm" operating conditions value will depend on the property in question. For example, the value of viscosity may increase by 300% from its optimised value and still the lubricant/working fluid will perform effectively.

In a traction fluid, preferably the value of traction coefficient is controlled to within +/−30% of its optimised value, more preferably to within +/−15% of its optimised value.

In the process of the present invention, the base fluid is specifically selected so that the two or more properties are optimal for "warm" operating conditions. By "optimal" is meant that the two or more properties of a particular composition of base fluid are such that the system performs better with respect to at least one, and preferably both, of these properties at "warm" operating temperatures than at cold start up or ambient operating temperatures.

For example, the base fluid may be a traction fluid which has a high coefficient of traction and low viscosity at "warm" operating temperatures but has a low coefficient of traction and high viscosity under cold start up conditions.

"warm" operating conditions are conditions under which the system is at a temperature greater than that under cold start-up or ambient conditions. Cold start up conditions can give rise to temperatures in the range of −40° C. to 25° C., depending on the climate. "Warm" operating conditions include operating conditions at which the system spends most of its working time, e.g. the working temperature of a machine. "Warm" operating conditions can include a range of temperatures up to the highest operating temperature of the system and may include different operating conditions of different components in the system. Typically for automotive traction drives this range is from 90° C. to 150° C. In large items of hydraulic equipment under warm operating conditions the temperature of the working fluid can be in the range of 50 to 95° C.

In a preferred embodiment, the base fluid has a high traction coefficient and a low viscosity at "warm" operating temperatures. Preferably the base fluid has traction coefficient measured at 2.2% SRR under a load of 1.125 GPa, of greater than 0.08 at temperatures between 90 and 150° C. and a viscosity of less than 100 mPas over the same temperature range. Suitable high traction fluids may contain a high proportion of saturated rings linked by short chains or fused in pairs or larger clusters. Said fluids may be conveniently obtained synthetically or by refinery processing of crude oil. Base fluids may be hydrocarbons or esters or contain ether or carbonate groups. Certain commercially available products such as that available under the trade designation "Techtrac M73" ex. Tekchem Corporation, Tokyo, Japan, contain mixtures of molecules that result from the hydrogenation of dimers and trimers of α-methyl styrene. The molecules typically consist of two or three cyclohexyl rings connected by short methyl-branched alkyl chains. Further higher-boiling components may also be present. These components may include structures containing condensed rings. Suitable base fluids can be prepared from these products by varying the proportion of dimers relative to that of higher-boiling components in the mixture. Varying the proportion of dimers to higher-boiling components varies the temperature at which the resulting fluid has its maximum traction coefficient. Thus, in one embodiment of the present invention, the proportion of dimers is selected so as to provide a base fluid with a maximum coefficient of traction at a particular temperature, i.e, the base fluid is custom-designed for a particular temperature range of "warm" operating conditions. Preferably, the base fluid comprises a mixture of dimers and trimers (including the condensed ring structures). Said base fluid generally comprises from 5 to 80 wt. %, preferably from 5 to 50 wt. % and more preferably from 10 to 30 wt. % of dimers, based on the total weight of the base fluid. The proportions are measured using gas chromatography with flame-ionisation detection.

The present invention provides a lubricant in which the traction and the viscosity of the lubricant can be maintained within narrow ranges over the entire temperature range that the traction drive operates from the coldest start to the peak operating temperature. Such constancy of properties cannot be achieved in a single fluid of unchanging composition. Hitherto it has been believed that the property of high traction exhibited by certain fluids under some conditions is a narrow and specific consequence of their composition and that the property of high traction would be lost on admixture of another fluid into the traction fluid. However, it has now been found that by choosing the base fluid and diluent according to specific criteria, the property of high traction possessed by the base fluid at one temperature can be maintained or nearly maintained at other temperatures by reversibly diluting the base fluid with the second fluid in specific ratios that depend upon the temperature. In this way two properties that are important in traction fluids, namely the viscosity and the traction coefficient, may be both maintained close to optimum values over a very wide temperature range (for example, 150° C.) using this technique of reversible dilution.

The diluent and the base fluid are selected so that they are miscible under all operating conditions. By miscible is meant that the diluent and base fluid dissolve when brought together and form one phase. "All operating conditions" includes cold start up or ambient conditions and "warm" operating conditions. The present invention therefore provides a single phase lubricating system suitable for use in a system in which operating conditions change. This provides significant advantages over the multiphase lubricating processes of the prior art.

Suitably the base fluid has a higher viscosity and a lower volatility than the diluent. In the case of the traction drive, the base fluid will typically have a viscosity greater than 5 mPas at 100° C. and the diluent will typically have a viscosity below 1 mPas at 100° C. and below 10 mPas at 0° C.

Suitable diluents will possess a low viscosity especially at temperatures below 0° C. The lower the viscosity of the diluent, the less is required to decrease the viscosity of the base fluid mixture. Suitably, the diluent has a melting range below −40° C. and a melting point below −50° C. The boiling range of the diluent should be low enough to enable it to be removed by evaporation from the mixture either at ambient or at reduced pressure. Examples of suitable diluents are decalin which is a mixture of cis- and trans- isomers of decahydronaphthalene and the solvent commercially available ex. Shell Chemicals in the USA under the trade designation "CYPAR-9", which predominantly contains methyl-substituted cyclohexanes with 9 carbon atoms. The diluent may also be a fuel such as gasoline or diesel.

Liquid hydrocarbon fuel oils of the gasoline boiling range are typically mixtures of hydrocarbons boiling in the temperature range from about 25° C. to about 232° C., comprising mixtures of saturated hydrocarbons, olefinic hydrocarbons and aromatic hydrocarbons.

The base fuel oil is derived from straight run gasoline, polymer gasoline, natural gasoline, dimer and trimerized olefins, synthetically produced aromatic hydrocarbon mixtures, from thermally or catalytically reformed hydrocarbons, or from catalytically cracked or thermally cracked petroleum stocks, and mixtures of these.

The hydrocarbon composition and octane level of the base fuel are not critical. The octane level, (R+M)/2, will generally be above about 85 (where R is Research Octane Number and M is Motor Octane Number).

Liquid hydrocarbon fuel oils which are middle distillate fuel oils typically have a boiling range in the range 100° C. to 500° C., e.g. 150° C. to 400° C. Petroleum-derived fuel oils may comprise atmospheric distillate or vacuum distillate, or cracked gas oil or a blend in any proportion of straight run and thermally and/or catalytically cracked distillates. Such fuel oils include kerosine, jet fuels, diesel fuels, heating oils and heavy fuel oils.

Diesel fuels typically have initial distillation temperature about 160° C. and final distillation temperature of 290-360° C., depending on fuel grade and use.

In a preferred embodiment, the diluent may comprise a mixture of hydrocarbons and/or organic esters having a boiling range within the range of from 50 to 200° C.

In another preferred embodiment of the present invention, a hydraulic fluid has an effective pressure response of viscosity over the entire temperature range that a hydraulic fluid must typically operate and which hydraulic fluid has an effective viscosity over the same temperature range.

Accordingly, the present invention provides a working fluid composition suitable for use in hydraulic systems which comprises a diluent and a base fluid which comprises glycerol and one or more additional components selected from alkylene glycols and/or polyoxyalkylene glycols.

The present invention also provides the use of said working fluid composition in a hydraulic system.

The diluent may be conveniently selected from water, hydrocarbons and hydrocarbon mixtures, alcohols, esters and ketones. Water is particularly preferred as a diluent.

Alkylene glycols that may be conveniently used include ethylene glycol and propylene glycol. Propylene glycol is particularly preferred.

The polyoxyalkylene glycols may be end-capped, non-end-capped or hemi-ether poly(oxyalkylene) alcohols produced by the addition of lower alkylene oxides, such as ethylene oxide, propylene oxide, the butylene oxides, or the pentylene oxides to an active hydrogen compound under polymerization conditions.

Methods of production and properties of these polymers are disclosed in U.S. Pat. No. 2,841,479 and U.S. Pat. No. 2,782,240 and Kirk-Othmer's "Encyclopedia of Chemical Technology", 2nd Ed., Volume 19, p. 553.

Block copolymers and random copolymers may be prepared by contacting the active hydrogen compound with a mixture of alkylene oxides, such as a mixture of ethylene and propylene or propylene and butylene oxides.

In a preferred embodiment, the polyoxyalkylene glycol that may be conveniently used in the fluid composition of the present invention is of the general formula (I)

$$R^1O\text{---}[(R^2O)_m(R^3O)_n]\text{---}R^4 \qquad (I)$$

wherein $R^1$ and $R^4$ are each, independently, alkyl, aryl, alkylaryl, aryloxy, alkoxy, alkylaryloxy or hydrogen; $R^2$ is —$CH_2$—$CH_2$— and $R^3$ is —$CH(CH_3)$—$CH_2$— and/or —$CH_2$—$CH(CH_3)$—, and m and n represent average numbers of $R^2O$ and $R^3O$ moieties in each polyoxyalkylene glycol such that m/(m+n) is in the range of 0.125 to 1 and n/(m+n) is in the range of 0 to 0.875 when the molecular weight of the polyoxyalkylene glycol is greater than 700 and m/(m+n) is in the range of 0 to 1 and n/(m+n) is in the range of 0 to 1 when the molecular weight of the polyoxyalkylene glycol is less than or equal to 700.

In said working fluid composition, preferably the amount of glycerol is in the range of from 1 to 95% by weight; the amount of alkylene glycol(s) is in the range of from 0 and 50% by weight; and the amount of polyoxyalkylene glycol(s) is in the range of from 0 to 90% by weight, all based on the total weight of the base fluid.

Preferably, said working fluid composition comprises base fluid in an amount in the range of from 50 to 100% wt., based on the total amount of base fluid and diluent.

In the process of the present invention the base fluid is reversibly diluted with the diluent in response to a change in the system operating conditions. The process further comprises a step in which a change in operating condition is detected directly or indirectly, e.g. by monitoring one or more properties of the lubricant. The properties of the lubricant that are monitored may be temperature, viscosity, composition, traction, density and refractive index amongst others.

Removal or separation of the diluent from the base fluid can be effected by means such as evaporation or distillation. In one embodiment of the present invention, energy generated by the system being lubricated is utilised to provide at least part, and preferably all, of the energy required in the separation of the diluent from the base fluid. This has clear benefits in the efficiency of the process of the present invention.

The energy generated by the system may be, e.g., heat energy, mechanical energy or electrical energy. The energy may be generated directly by the operating components being lubricated or to which the working fluid has been applied, e.g., heat energy. The energy may be generated indirectly by the system, e.g., heat energy produced by an engine which drives wheels through a transmission or electricity produced by an electricity-generating windmill which comprises a traction drive.

The present invention further provides apparatus suitable for carrying out the process of the present invention which apparatus comprises means for reversibly diluting the base fluid with the diluent and means by which energy generated by the system is utilised to provide at least part of the energy required in the separation of the diluent from the base fluid. The means for reversibly diluting the base fluid with the diluent include means for adding the diluent to the base fluid and means for removing diluent from the base fluid.

The apparatus of the present invention may further comprise:
(i) reservoir means comprising a diluent;
(ii) a mixing zone comprising a base fluid;
(iii) dispensing means for supplying the diluent from the reservoir means to the mixing zone;
(iv) separating means for removing diluent from the mixing zone; and
(v) means enabling the contents of the mixing zone to contact an operating component of the system.

In an embodiment of the present invention, there is provided an apparatus for carrying out the process of any one of the preceding claims which comprises:
(i) reservoir means comprising a diluent;
(ii) a mixing zone comprising a base fluid;
(iii) dispensing means for supplying the diluent from the reservoir means to the mixing zone;
(iv) separating means for removing diluent from the mixing zone; and
(v) means by which energy generated during operation of the system is utilised by the separating means to separate the diluent from the mixing zone.

The mixing zone may be, e.g. the sump or main fluid reservoir for a transmission or the main fluid reservoir in a hydraulic system. The means enabling the contents of the mixing zone to contact an operating component of the system may comprise a series of pumps and an oil circuit.

The apparatus may also comprise means for monitoring a change in system operating conditions such as a programmable controller which may form part of a main engine management system. The programmable controller may be used to assess the current composition and properties of the mixture and to instigate the withdrawal or addition of diluent as required by the state or operating condition of the machine.

The apparatus of the present invention comprises means for separating the base fluid from the diluent. Separation may be effected by evaporation or distillation of the relatively volatile diluent from the mixture of diluent and base fluid, optionally under reduced pressure. The separating means typically consists of a device to perform flash distillation, vacuum distillation or distillation of the mixture of base fluid and diluent. Separation can be controlled to remove the diluent from the mixture at the desired rate. In one embodiment, the lubricant or working fluid is pumped to the separator by an oil pump, preferably the system's main oil pump, with a proportion of the lubricant/working fluid flow being passed through the separator. This proportion is variable from 0 to 100%.

In the separating means the incoming mixture is heated to a temperature high enough to form an appreciable vapour pressure of the relatively volatile diluent. The vapour and the depleted residual base lubricant are separated, this may be achieved using a pump. The vapour can then be condensed and stored for re-use and the residual base lubricant can be re-injected into the lubricant circuit at some point, for example, at the sump.

Energy may be required to heat the mixture to the separation temperature and to evaporate the diluent. The apparatus of the present invention further comprises means by which energy generated by the system being lubricated or to which the working fluid is applied is utilised in the separation of the diluent from the base fluid. In one embodiment of the apparatus of the present invention, the separator draws some of the heat required for the separating step from the surplus heat rejected by the engine that drives the machine. Engines reject excess heat into the coolant (water/antifreeze), into exhaust gases, and into the engine lubricant. Each of these may be used as sources of heat for the separator. In general the distillation step will operate by removing a small proportion of the liquid flowing through it. It follows that much of the heat put into the lubricant mixture to raise it to the distillation temperature, can be recovered and used to heat the incoming flow of fresh mixture into the separator.

The separator may consist of one or several heat exchangers through which the incoming mixture passes in sequence before reaching the distillation chamber. These heat exchangers are used to progressively raise the temperature of the incoming mixture, and can be used to lower the temperature of the depleted mixture after it has passed through the distillation or evaporation chamber. A typical sequence might pass the incoming base fluid/diluent mixture through one or more of the following stages, each being identified in the list by the source of the heat that is used to raise the temperature of the incoming mixture:

(a) Engine hot water stage, in which the incoming mixture is heated, e.g. from the current sump temperature to approximately 85° C., by thermal contact with hot water from the engine cooling system. Such hot water is generally available after approximately a minute of engine operation. This heat exchanger can operate passively until, e.g., the incoming mixture reaches 85° C., at which point the flow of water may be switched off.

(b) Hot lubricant stage, in which the incoming mixture is heated by thermal contact with a stream of lubricant or working fluid that has passed through the evaporation chamber.
(c) Diluent vapour condensation stage, in which hot vapour from the distillation chamber is condensed, realising the heat of vaporisation to the incoming mixture.
(d) Engine-exhaust heating stage, in which heat is obtained, most probably by an indirect method, from the hot exhaust gases. This stage might be combined with stage (c), using vapour produced by boiling the diluent in a tube around the exhaust pipe to transfer heat.
(e) Electrical heating stage, most probably forming part of the evaporating chamber, in which the input steam is heated finally to the temperature at which the separation by evaporation proceed at the desired rate.

In one embodiment of the present invention, one of more of the heating stages operate passively, with the proviso that certain flows may be stopped by closing valves at some temperatures. Furthermore, the optional stage in (d) in which heat is transferred from the exhaust by condensing vapour, can be designed so as to stop automatically when the evaporation of the diluent from the mixture is complete.

The use of reduced pressure, that is a pump to move the vapour that evaporates from the mixture, may form part of the separator scheme. The vapour pump may be mechanical, such as an axial or a turbine compressor, or a vane pump, or a centrifugal pump; or alternatively it may take the form of a vapour jet ejector pump, whose application is described in more detail below. The purpose of the pump is to enable the separation of vapour and mixture to occur at a lower temperature. It is not necessary that the pressure be reduced to a point at which the mixture would boil. The purpose of the pump would be to remove the vapour that is in equilibrium with the mixture, so as to permit the evaporation of more vapour.

If a vapour-jet ejector is used as the pump, the motive gas for the ejector could be the vapour of the compressed diluent itself. The compressed liquid would need to be heated to a temperature high enough to ensure that the vapour saturation pressure provides the necessary motive flow through the ejector. The heat for this could be obtained from the surplus heat of the engine. The flow of motive gas or vapour through the ejector would be combined with the 'suction flow' of vapour (of the same composition) coming out of the mixture. This jet of vapour would be condensed to liquid in a heat-exchanger, transferring the heat of the condensing vapour to one or both of two other liquid streams: the flow of diluent towards the high-pressure, high-temperature side of the vapour jet ejector, and the flow of oil/diluent mixture towards the separator.

The motive gas for the ejector could alternatively be steam which could be generated by using surplus heat from the engine or energy from another source. The steam combines with the suction flow of vapour in the diffusion zone of the ejector and both vapours are condensed so as to impart their heat usefully to other streams as described above. The condensed water and the diluent, if the latter is immiscible with water, can be separated and the diluent stored for re-use in the reservoir. In this case the water would not act as a lubricant and would not contact the lubricated surfaces. If the diluent is water no separation would be possible or necessary.

In yet another variant, vapour may be drawn from the environment of the lubricated machine part. For example, in the traction drive, the fluid is used to lubricate machine parts that are moving rapidly and imparting heat to the lubricant. It is anticipated that the movements of the machine parts will create films and droplets of lubricant so that the total surface area of the lubricant will be large enough to facilitate rapid evaporation of the diluent vapour. This vapour can be pumped away continuously, separating droplets of the base fluid as necessary. This approach is beneficial in avoiding the development of flammable concentrations of vapour in the spaces surrounding lubricated machine parts.

The process of the present invention is illustrated by the following examples.

EXAMPLE 1

In this example, the variation with temperature of traction coefficient and viscosity of a lubricant according to the present invention was investigated.

Viscosity measurements were made with a Rheolyst cone-on-plate rheometer. Traction coefficients were measured using a "Mini-Traction Machine" manufactured by PCS Instruments Ltd of London. In this device, a polished steel ball (¾ inch diameter) is caused to rotate against a polished steel ring which is also rotated. The speeds of the ball and the ring are controlled separately so that the ratio of the sliding motion to rolling motion can be adjusted by the machine. The pressure in the contact is adjusted by the load applied to the arm that bears the rotating ball. The ball and ring are immersed in the lubricant whose temperature is controlled. Measurements were made at different slide-to-roll ratios (SRR) and under different applied loads. Most of the results quoted have been obtained at 2.2% SRR under loads that generated pressures close to 1.125 GPa in the lubricated contact. The remaining results were obtained at other values of the slide to roll ratio. These were corrected to provide an estimated value of the traction coefficient at 2.2% SRR.

The base fluid used was a distillation cut of the product available under the trade designation "Techtrac M73" ex. Tekchem Corporation (1-13-31 Denenchoufu, Ohtaku, Tokyo 145, Japan), such that the proportion of dimers was about 10% by weight of the mixture. By about in this context is meant +/−3%. The proportion of dimers to other compounds in the mixture, was determined by gas chromatography using a flame-ionisation detector.

The diluent used was the solvent commercially available ex. Shell Chemicals in the USA under the trade designation "CYPAR-9", which predominantly contains methyl-substituted and ethyl-substituted cyclohexanes with 9 carbon atoms.

The viscosity and the traction coefficient of the base fluid were measured as a function of temperature. The results are shown in Table 1.

TABLE 1

| Temperature/° C. | Traction Coefficient | Viscosity/mPas |
| --- | --- | --- |
| 150 | 0.097[1] | 5.0* |
| 140 | 0.102[m] | 6.5 |
| 130 | 0.106[2] | 8.9* |
| 120 | 0.109[2] | 12.5 |
| 110 | 0.110[2] | 18.6* |
| 100 | 0.111[m] | 29.3 |
| 90 | 0.109[2] | 49.6* |
| 80 | 0.104[2] | 92.5 |
| 70 | 0.094[m] | 195* |
| 60 |  | 484 |
| 50 |  | 1500* |
| 40 |  | 6272 |

*The viscosity at these temperatures was obtained by interpolation, using a Vogel expression fitted to the measurements made at other temperatures. The Vogel expression fitted the data closely above 40° C.
[m]Direct measurement
[1]Estimated
[2]Measured at 5% SRR and corrected to 2.2%. To make the correction, the values were reduced slightly from those measured. The largest correction was 0.006.

As shown in Table 1, this lubricant possesses a high and nearly constant traction coefficient over much of the range of temperature of importance in the warm operating condition (70 to 150° C.). Furthermore the traction coefficient declines steeply as the temperature falls below 60° C. The viscosity changes quite slowly in the temperature range 100 to 150° C., but at lower temperatures begins to increase rapidly and exceeds 6 Pas at 40° C. and 43 Pas at 30° C. On inspection, this fluid can be seen to be unacceptably viscous at room temperature.

The base fluid was then mixed with varying amounts of the diluent. The traction coefficient and the viscosity at varying temperatures of the resultant mixtures were then measured. By tracing the traction coefficient as a function of composition and temperature it was established what mix of base fluid and diluent would be optimum at each temperature. The results are shown in Table 2.

TABLE 2

| Temperature/° C. | Traction Coefficient | Viscosity/mPas | Wt % diluent in mixture |
|---|---|---|---|
| 100 | 0.111 | 18.6 | 1 |
| 90 | 0.109 | | 1.9 |
| 80 | $0.108^M$ | $55^E$ | 4.3 |
| 65 | $0.106^M$ | $60^E$ | 9.6 |
| 55 | 0.102 | 54 | 14.2 |
| 45 | 0.097 | 36 | 19.4 |
| 30 | $0.095^M$ | $40^E$ | 27.5 |
| 0 | 0.094 | 51 | 36.6 |

$^E$Estimated since no measurement available at precisely these conditions.
$^M$These are the minimum traction coefficients expected at these conditions. No measurements were available at precisely the correct conditions. These numbers are measurements made at these temperatures but on concentrations that are not quite optimum.

The results in Table 2 shows that the viscosity and traction coefficient of a base fluid can be controlled by progressively diluting a base fluid with a liquid consisting predominantly of methyl-substituted cyclohexanes. If no further dilution were made and the composition shown at 0° C. were retained to a temperature of −40° C., the viscosity would increase to approximately 2.5 Pas. Such a viscosity is far lower than that achieved by other traction fluids. In particular the results show that the maximum traction coefficient can be maintained at lower temperatures while simultaneously keeping the viscosity under control. From these results it can also be concluded that the above traction fluid mixture is suitable for use in traction devices where the operating temperature is expected to lie in the range of 70 to 150° C., where the lower temperature is the temperature of the reservoir of the base fluid and diluent mixture and the upper temperature is that experienced in the track where one element of the traction drive rolls over another so as to transmit the torque.

EXAMPLE 2

In this Example, it is shown how reversible dilution can be used to maintain at a constant value, the viscosity of a composition that could be used as a hydraulic fluid. Either the viscosity at ambient pressure, or the viscosity at an elevated pressure, may be held constant over a range, and both may be held within a much narrower range than would be possible in a fluid of constant composition.

The film thickness formed by the liquid in an elastohydrodynamic (EHD) lubricated contact can be controlled within a narrow range simultaneously. Hydraulic fluids are frequently required to act as lubricants by forming a load-bearing film of liquid between metal surfaces, that approach each other closely but must be kept apart to avoid wear. Such requirements for EHD lubrication may occur within the pumps that supply fluid at elevated pressure to the hydraulic actuators. In EHD lubrication, the thickness of the film of liquid between two moving surfaces depends both on the viscosity of the fluid at the intake to the lubricated zone, and on the pressure-viscosity coefficient. The pressure-viscosity coefficient describes the increase of viscosity with pressure in the liquid, and may be defined as the slope of a plot of the natural log of the viscosity against pressure.

The pressure-viscosity coefficient of most liquids decreases with temperature. In a lubricant of constant composition, the load-bearing film has a strong tendency to decrease with increasing temperature because both the viscosity and the pressure-viscosity coefficient decrease with rising temperature.

Viscosity measurements were made with a Rheolyst cone-on-plate rheometer. Film-thickness measurements were made in an optical ball-on-plate rheometer. In this apparatus, a steel ball is cause to rotate and slide against a rotating disk of transparent material. The oil film thickness can be measured with the use of the interference fringes formed in the fluid-filled gap between the disk and the ball. The pressure-viscosity coefficient can be estimated from the film thickness.

The base fluid used was a mixture of glycerol and mono-propylene glycol (propane-1,2-diol). By varying the relative proportions of these two fluids, the viscosity at different temperatures can be selected. In this Example, the base fluid was a mixture of 90% by weight glycerol and 10% by weight mono-propylene glycol. A mixture of this base fluid with water, in which the water content of the final mixture is up to 40% by weight, has a final melting point at or below −40° Celsius.

For the purposes of this Example, the water content of the mixture was restricted to the range 5 to 35% by weight of the ternary mixture. That is to say, a composition described as "35% water" consists of 35% by weight of water mixed with 65% by weight of base fluid, where the base fluid in turn was the 90/10 mixture described above.

The composition was held constant over the temperature range from −40° C. up to the target value at which it is to be maintained constant. For the purpose of this Example, the constant viscosity was selected be 30 mPa·s. Viscosities higher or lower than 30 mPa·s could be selected for this or similar mixtures.

In Table 3, the viscosity of the mixture with 35% water is shown as a function of temperature from −40° C. to 7.8° C., at which temperature the viscosity has fallen to 30 mPa·s.

TABLE 3

| Temperature (° C.) | Viscosity (mPa · s) |
|---|---|
| −40 | 2300 |
| −30 | 688 |
| −20 | 246 |
| −10 | 104 |
| 0 | 48.3 |
| 7.8 | 30.0 |

The viscosity (at ambient pressure) can be held constant at 30 mPa·s by reducing the water content as the temperature rises. In this example, it has been assumed that the water content will not be reduced below 5% by weight. In Table 4, the fluid composition that yields a viscosity of 30mPa·s is indicated at each temperature.

TABLE 4

| Temperature (° C.) | % water by weight, in a mixture with 90/10 base fluid |
|---|---|
| 7.8 | 35.0 |
| 20 | 27.6 |
| 30 | 21.7 |
| 40 | 16.0 |
| 50 | 10.9 |
| 60 | 5.85 |
| 61.7 | 5.00 |

Thus, over the temperature range from 7.8° C. to 61.7° C. the ambient-pressure viscosity can be maintained constant at 30mPa·s by altering the composition according to the scheme above. This may be called the region of control.

The values of the pressure-viscosity coefficients determined in fluids of different compositions within the region of control, are presented in Table 5.

TABLE 5

| Fluid Composition (wt % water in the mixture) | Pressure-viscosity coefficient, GPa$^{-1}$ |
|---|---|
| 35 | 3 |
| 25 | 3.5 |
| 15 | 4 |
| 5 | 6 |

These pressure-viscosity coefficients were calculated from measurements of film thickness using the Dowson-Hamrock equation, $$h_c 32\ k\alpha^{0.53}(U\eta_0)^{0.67}$$

Where $h_c$ is the film thickness, k is an apparatus constant, $\alpha$ is the pressure-viscosity coefficient, U is the entrainment speed, and $\eta_0$ is the viscosity at ambient pressure.

Measurements of the film thickness in the four fluids of Table 5, were made at the temperatures at which each of these compositions would be employed if the ambient-pressure viscosity were to be held constant or nearly constant, at 30 mPas. The exception was the fluid containing 35% water. This composition is correct for a temperature of 7.8° C., but the film thickness was measured at room temperature because it was not possible to operate the apparatus at lower temperature. When allowance is made for this, it can be seen that the pressure-viscosity constant changes slowly across the region of control until the water content is low. The pressure-viscosity coefficient (and the film thickness) increases as the water content falls towards 5%.

It is possible to use the Dowson-Hamrock equation, with the measured value for the parameters k and α and measured values for the viscosity, to estimate the film thickness at other temperatures and at conditions slightly different from those of the measurements. A value for the entrainment speed (1.13 ms$^{-1}$, where the log of film thickness was increasing linearly with speed) was selected from the range used in the measurements of film thickness, for these calculations. Table 6 below presents the results of such calculations, for the viscosity at ambient pressure; the viscosity at an assumed working pressure of 20 MPa; and for the film thickness under the conditions of the measurement in the ball-on-plate rheometer. The results fall into three groups:

(1) At temperatures below 8.8° C., the composition was assumed to be constant at 35% water. The film thickness was estimated from the Dowson-Hamrock equation using the pressure-viscosity coefficient measured for this composition.

(2) At temperatures in the control region between 8.8 and 64.5° C., it was assumed that the composition would change so as to allow the ambient viscosity to decline slightly, to the extent that the viscosity at the working pressure would remain constant at 30 mPas. Small adjustments to the measured film thicknesses were made to allow for the small changes to the assumed intake viscosities.

(3) At temperatures above 64.5° C., the composition was assumed to be constant at 5% water, and film thicknesses were estimated from the Dowson-Hamrock equation using the pressure-viscosity coefficient measured for this composition.

TABLE 6

| Temperature/° C. | Viscosity/mPas at 0.1 MPa | Viscosity/mPas at 20 MPa | Film Thickness/ nm |
|---|---|---|---|
| −30 | 785 | 833 | 686 |
| −20 | 247 | 262 | 316 |
| −10 | 100 | 106 | 172 |
| 0 | 48 | 51 | 106 |
| 8.8 | 28.3 | 30 | 74 |
| 25.4 | 28 | 30 | 80 |
| 43.4 | 27.7 | 30 | 85 |
| 64.5 | 26.6 | 30 | 102 |
| 75 | 17.2 | 19.4 | 76 |
| 80 | 14.3 | 16 | 68 |
| 85 | 12 | 13.5 | 60 |
| 90 | 10.2 | 11.5 | 54 |

Note that the temperatures that define the ends of the region of control, shift slightly when the viscosity is held constant at elevated pressure rather than ambient pressure.

If the fluid mixtures described in this Example were to be used in conjunction with an apparatus to adjust the composition over the region of control, the effective viscosity would vary according to Table 6. The viscosity could be maintained at a constant value between 8.8 and 64° C. by varying the composition in accordance with the process of this document. Above and below this region of control, the viscosity would vary normally. The change in composition also affects the pressure-viscosity response, so as to reduce or eliminate the tendency of the oil film thickness under EHD conditions, to decrease. The load-bearing capacity of the fluid is thereby maintained. If no change in composition were made, the variation of viscosity of the base fluid would be unacceptably rapid for use in a hydraulic circuit exposed to varying temperatures. It must be noted that the oil film thicknesses shown here are those found in the laboratory measurement apparatus and apply to that specific combination of materials, geometry and load. The oil film thickness in other bearings would be different.

It will be evident that the use of different base fluids would enable the region of control to be established over different temperature ranges and at different viscosities. In this way, the mechanical and volumetric efficiencies of a hydraulic system would be maintained at or close to their optimal level, over a range of temperature from cold start to the warm operating temperature.

I claim:

1. A process for controlling at least two properties of a lubricant or working fluid for use in a system in which operating conditions change which process comprises:
   (i) providing a base fluid in which the properties are optimal for "warm" operating conditions;
   (ii) providing a diluent which is miscible with said base fluid under all system operating conditions; and
   (iii) reversibly diluting said base fluid with the diluent in response to change in system operating conditions;
   wherein the at least two properties include viscosity and at least one additional property selected from the group consisting of traction coefficient, compressibility, lubricating film thickness and pressure response of viscosity.

2. The process of claim 1 in which base fluid has a traction coefficient which is greater than 0.08 (at 2.2% SRR and 1.125 GPa).

3. The process of claim 1 in which the base fluid comprises a hydrogenated mixture of dimers and trimers of α-methyl styrene.

4. The process of claim 1 in which the base fluid comprises glycerol and one or more additional components selected from the group consisting of alkylene glycols, polyoxyalkylene glycols, and mixtures thereof.

5. The process of claim 1 in which the diluent is chosen from a fluid comprising a mixture of cis and trans isomers of decahydronaphthalene and a fluid comprising methyl-substituted and ethyl-substituted cyclohexanes with 9 carbon atoms on average.

6. The process of claim 1 in which the diluent comprises a mixture of hydrocarbons and/or organic esters having a boiling range within the range of from 50° C. to 200° C.

7. The process of claim 1 in which the diluent is water.

8. A process for lubricating a system in which operating conditions change which process comprises:
   (i) controlling at least two or more properties of a lubricant accordance with the according to the process of claim 1; and
   (ii) applying the resultant lubricant to the system.

9. A process for providing a working fluid to a system in which operating conditions change which process comprises:
   (i) controlling at least two properties of the working fluid according to the process of claim 1; and
   (ii) supplying the resultant working fluid to the system.

10. The process of claim 1 in which the step of reversible dilution involves a step of removing diluent from a mixture of base fluid and diluent by evaporation or distillation and energy generated by the system is used to provide at least part of the energy required for this step.

11. The process of claim 10 in which the energy generated by the system is supplied from one of:
   (i) hot water from the system cooling system;
   (ii) lubricant or working fluid that has already passed through an evaporation or distillation stage;
   (iii) heat of vaporization from hot vapor in a distillation or evaporation chamber;
   (iv) exhaust gases; and
   (v) an electrical heating stage.

12. The process of claim 1 in which the base fluid has a viscosity of less than 100 mPas in the temperature range 90° C. to 150° C.

13. The process of claim 2 in which the base fluid has a viscosity of less than 100 mPas in the temperature range 90° C. to 150° C.

* * * * *